United States Patent [19]

Hozumi

[11] Patent Number: 5,974,174
[45] Date of Patent: Oct. 26, 1999

[54] PICTURE-INFORMATION PROCESSING APPARATUS

[75] Inventor: Yoshiko Hozumi, Zushi, Japan

[73] Assignee: Victor Company of Japan, Ltd., Yokohama, Japan

[21] Appl. No.: 08/721,204

[22] Filed: Sep. 26, 1996

[51] Int. Cl.[6] ................................................ G06K 9/48
[52] U.S. Cl. .................... 382/199; 382/162; 382/195; 382/213; 382/218; 382/232; 382/233; 382/237; 382/241; 382/266
[58] Field of Search ............................... 382/199, 195, 382/163, 164, 165, 166, 173, 192, 201, 206, 213, 217, 218, 232, 233, 235, 237, 241, 244, 266, 268, 283, 307

[56] References Cited

U.S. PATENT DOCUMENTS

| | | | |
|---|---|---|---|
| 4,447,809 | 5/1984 | Kodama et al. | 340/747 |
| 4,782,383 | 11/1988 | Isnardi | 358/12 |
| 4,953,027 | 8/1990 | Tong et al. | 358/188 |
| 5,014,334 | 5/1991 | Fukuhara et al. | 382/86 |
| 5,053,861 | 10/1991 | Tsai et al. | 358/13 |
| 5,060,280 | 10/1991 | Mita et al. | 382/33 |
| 5,187,592 | 2/1993 | Sugiyama et al. | 358/430 |
| 5,261,049 | 11/1993 | Lumelsky et al. | 395/164 |
| 5,420,971 | 5/1995 | Westerink et al. | 395/133 |
| 5,523,793 | 6/1996 | Fujita et al. | 348/437 |
| 5,583,794 | 12/1996 | Shimizu et al. | 364/514 |
| 5,687,251 | 11/1997 | Erler et al. | 382/133 |

FOREIGN PATENT DOCUMENTS

| | | |
|---|---|---|
| 6231235 | 8/1994 | Japan . |
| 7296170 | 11/1995 | Japan . |

Primary Examiner—Leo H. Boudreau
Assistant Examiner—Kanji Patel
Attorney, Agent, or Firm—Pollack, Vande Sande & Amernick

[57] ABSTRACT

In a picture-information processing apparatus, information of an edge in a picture is generated from information of luminances in the picture. Data of a mask corresponding to the edge is generated from the information of the edge. Information of feature points on an equal-luminance line in the picture is generated from the information of the luminances in the picture. The equal-luminance line is composed of segments extending between the feature points. A decision is made as to whether or not each of the segments of the equal-luminance line agrees with an edge line segment in response to the data of the mask and the information of the feature points. An edge decision signal is generated which represents the result of the decision. The edge decision signal is added to the information of the feature points.

5 Claims, 12 Drawing Sheets

| −1 | −1 | −1 |
| −1 | 8 | −1 |
| −1 | −1 | −1 |

PICTURE-INFORMATION PROCESSING APPARATUS

BACKGROUND OF THE INVENTION

1. Field of the Invention

This invention relates to a processing apparatus designed to subject moving-picture information to highly efficient encoding or decoding.

2. Description of the Prior Art

Japanese published unexamined patent applications 6-231235 and 7-296170 disclose prior-art compressing apparatuses in which information of equal-luminance lines (iso-luminance lines) is generated from picture luminance information, and feature points are derived from the equal-luminance lines. Then, the picture luminance information is compressed in response to information of the feature points.

A portion of a picture which has an abrupt change of luminance is referred to as a picture edge portion. On the other hand, a portion of a picture which has a gradual change of luminance is referred to as a picture gradation portion.

In a prior-art expanding apparatus for compression-resultant picture luminance information, it is difficult to discriminate a picture edge portion and a picture gradation portion from each other. The same interpolation using mean values is applied to both the recovery of original information of the picture edge portion and the recovery of original information of the picture gradation portion. As a result, the recovered picture edge portion tends to have a less abrupt change of luminance. On the other hand, the recovered picture gradation portion tends to have a step-like difference in luminance.

SUMMARY OF THE INVENTION

It is an object of this invention to provide an improved processing apparatus for picture information.

A first aspect of this invention provides a picture-information processing apparatus comprising first means for generating information of an edge in a picture from information of luminances in the picture; second means for generating data of a mask corresponding to the edge from the edge information generated by the first means; third means for generating information of feature points on an equal-luminance line in the picture from the information of the luminances in the picture, wherein the equal-luminance line is composed of segments extending between the feature points; fourth means for deciding whether or not each of the segments of the equal-luminance line agrees with an edge line segment in response to the edge mask data generated by the second means and the feature-point information generated by the third means, and for generating an edge decision signal representing a result of said deciding; and fifth means for adding the edge decision signal generated by the fourth means to the feature-point information generated by the third means.

A second aspect of this invention is based on the first aspect thereof, and provides a picture-information processing apparatus wherein the second means comprises means for comparing the edge information generated by the first means with reference data to binarize the edge information into the edge mask data.

A third aspect of this invention is based on the first aspect thereof, and provides a picture-information processing apparatus further comprising sixth means for detecting a change in the edge decision signal generated by the fourth means, and seventh means for controlling said adding by the fifth means in response to the change detected by the sixth means.

A fourth aspect of this invention provides a picture-information processing apparatus comprising first means for generating information of a multi-value mask from information of feature points on an equal-luminance line in a picture; second means for generating data of a file of adjustment values corresponding to respective pixels of the picture in response to the information of the feature points and information of an edge in the picture; and third means for recovering information of luminances in the picture in response to the multi-value mask information generated by the first means and the adjustment-value file data generated by the second means.

DESCRIPTION OF THE PREFERRED EMBODIMENTS

First Embodiment

Figure 1:
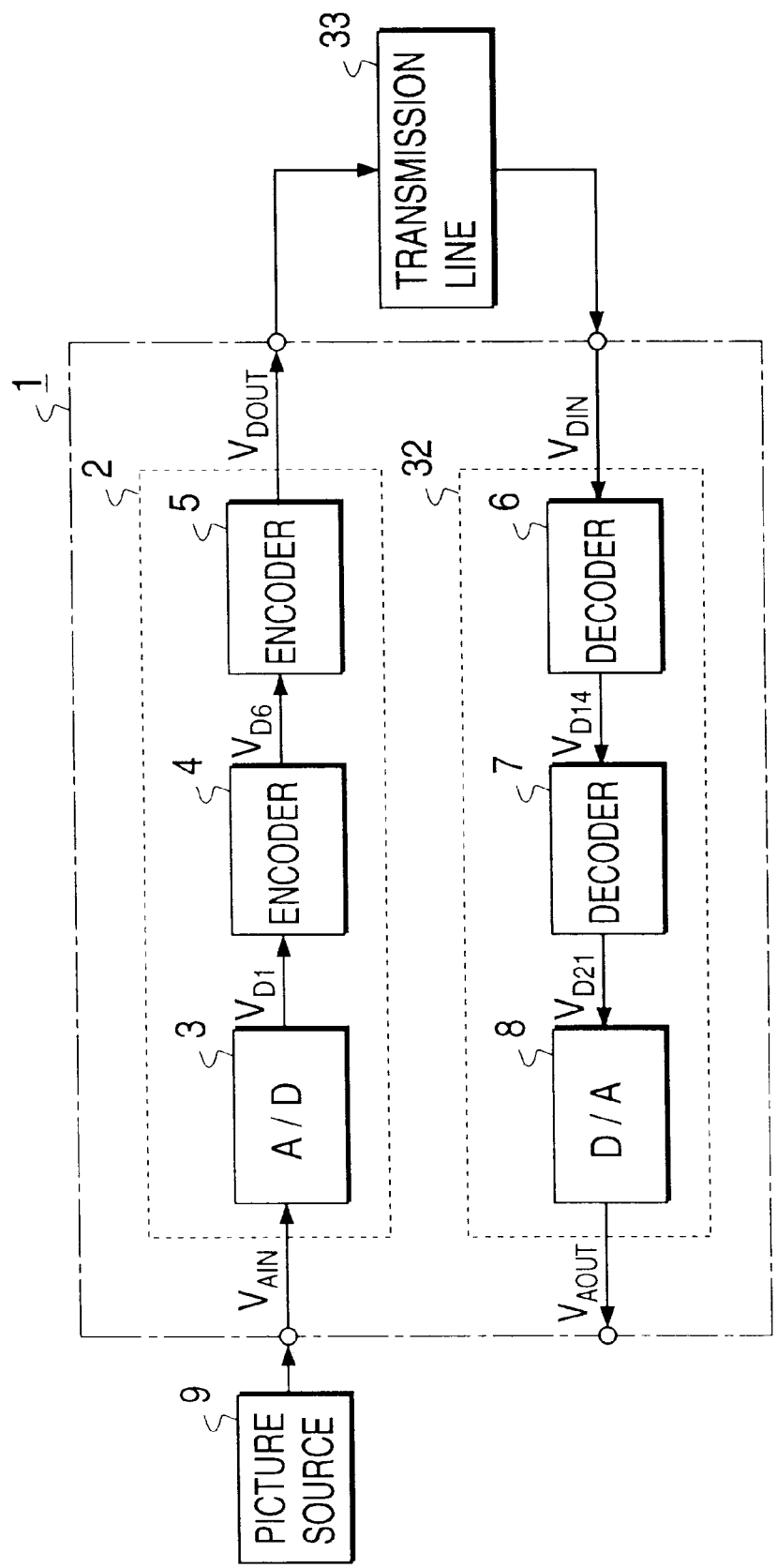
FIG. 1 is a block diagram of a picture-information processing apparatus according to a first embodiment of this invention.

With reference to FIG. 1, a picture-information processing apparatus 1 includes a compressing section 2 and an expanding section 32. The compressing section 2 has an analog-to-digital (A/D) converter 3, a first encoder 4, and a second encoder 5. The A/D converter 3 follows a picture-information source 9. The A/D converter 3 is successively followed by the first encoder 4 and the second encoder 5. The output side of the second encoder 5 is connected to a transmission line 33. The transmission line 33 includes, for example, an information recording apparatus, a recording medium, and an information reproducing apparatus.

The expanding section 32 has a first decoder 6, a second decoder 7, and a digital-to-analog (D/A) converter 8. The input side of the first decoder 6 is connected to the transmission line 33. The first decoder 6 is successively followed by the second decoder 7 and the D/A converter 8.

Analog picture information (analog luminance information) $V_{AIN}$ outputted from the picture-information source 9 is changed by the A/D converter 3 into corresponding digital luminance information $V_{D1}$. The A/D converter 3 outputs the digital luminance information $V_{D1}$ to the first encoder 4.

The first encoder 4 extracts or derives information of feature points of equal-luminance lines (iso-luminance lines) and information of edges from the digital luminance information $V_{D1}$. The first encoder 4 combines the information of the feature points and the information of the edges into composite information (edge and feature-point information) $V_{D6}$. The first encoder 4 outputs the edge and feature-point information $V_{D6}$.

The second encoder 5 receives the edge and feature-point information $V_{D6}$ from the first encoder 4, and encodes the edge and feature-point information $V_{D6}$ into corresponding words of a given code suited to the characteristics of the transmission line 33. The second encoder 5 outputs data $V_{DOUT}$ representative of the words of the given code to the transmission line 33.

The first decoder 6 receives data $V_{DIN}$ from the transmission line 33, and decodes the data $V_{DIN}$ into edge and feature-point information $V_{D14}$. The data processing by the first decoder 6 is inverse with respect to the data processing by the second encoder 5. The first decoder 6 outputs the edge and feature-point information $V_{D14}$.

The second decoder 7 receives the edge and feature-point information $V_{D14}$ from the first decoder 6, and decodes the edge and feature-point information $V_{D14}$ into digital luminance information $V_{D21}$. Specifically, the second decoder 7 generates information of a multi-value mask and information of a file of adjustment values from the edge and feature-point information $V_{D14}$. The second decoder 7 recovers the digital luminance information $V_{D21}$ from the information of the multi-value mask and the information of the file of the adjustment values. The data processing by the second decoder 7 is inverse with respect to the data processing by the first encoder 4. The second decoder 7 outputs the digital luminance information $V_{D21}$.

The D/A converter 8 receives the digital luminance information $V_{D21}$ from the second decoder 7, and converts the digital luminance information $V_{D21}$ into corresponding analog luminance information (corresponding analog picture information) $V_{AOUT}$. Thus, the D/A converter 8 recovers the original analog picture information $V_{AOUT}$. The D/A converter 8 outputs the recovered analog picture information $V_{AOUT}$.

Figure 2:
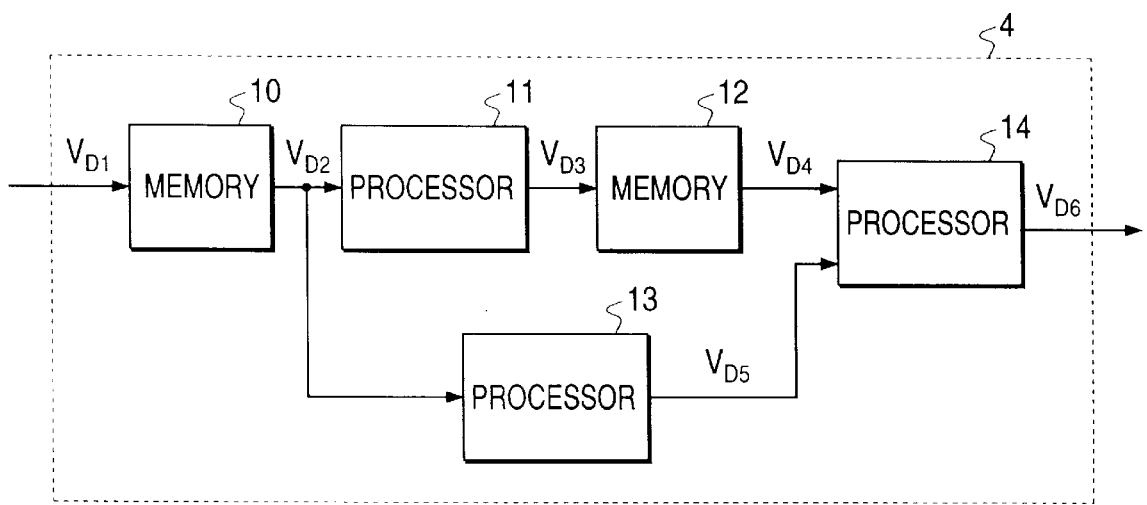
FIG. 2 is a diagram of an encoder in FIG. 1.

As shown in FIG. 2, the first encoder 4 has a first memory 10, a first processor 11, a second memory 12, a second processor 13, and a third processor 14. The input side of the first memory 10 follows the A/D converter 3 (see FIG. 1). The output side of the first memory 10 Is connected to the input sides of the first and second processors 11 and 13. The output side of the first processor 11 is connected to the input side of the second memory 12. The output side of the second memory 12 is connected to the input side of the third processor 14. The output side of the second processor 13 is connected to the input side of the third processor 14. The output side of the third processor 14 is followed by the second encoder 5 (see FIG. 1).

The digital luminance information $V_{D1}$ outputted from the A/D converter 3 (see FIG. 1) is stored into the first memory 10. The digital luminance information $V_{D1}$ is read out from the first memory 10 before being fed to the first and second processors 11 and 13. The digital luminance information fed to the first and second processors 11 and 13 from the first memory 10 is now denoted by "$V_{D2}$".

The first processor 11 traces pixels having equal luminance values, and thereby generates information of equal-luminance lines (iso-luminance lines) from the luminance information $V_{D2}$ in a known way such as the way disclosed by Japanese published unexamined patent application 7-296170. The first processor 11 extracts or derives feature points from the equal-luminance lines in a known way such as the way disclosed by Japanese published unexamined patent application 7-296170. For example, the first processor 11 converts the equal-luminance lines into approximate equal-luminance lines having polygonal shapes. The first processor 11 defines corners of the polygonal shapes as feature points. The first processor 11 generates information of positions of the feature points, that is, address information of the feature points. Also, the first processor 11 generates information of luminance values (luminance level numbers) at the feature points which agrees with information of luminance values corresponding to respective equal-luminance lines (iso-luminance lines). The first processor 11 outputs feature-point information $V_{D3}$ composed of the address information and the level-number information.

Figure 3:
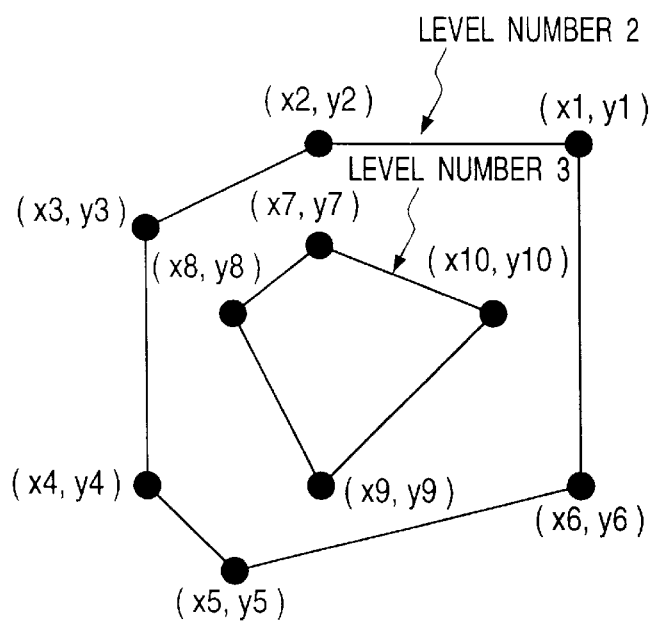
FIG. 3 is a diagram of an example of approximate equal-luminance lines (approximate iso-luminance lines) and feature points thereon.

FIG. 3 shows an example of approximate equal-luminance lines (approximate iso-luminance lines) having polygonal loop shapes. In FIG. 3, the outer equal-luminance line is composed of straight line segments connecting feature points at positions (x1, y1), (x2, y2), (x3, y3), (x4, y4), (x5, y5), and (x6, y6). The outer equal-luminance line corresponds to a luminance level number of "2". In FIG. 3, the inner equal-luminance line is composed of straight line segments connecting feature points at positions (x7, y7), (x8, y8), (x9, y9), and (x10, y10). The inner equal-luminance line corresponds to a luminance level number of "3". In this case, the feature-point address information generated by the first processor 11 represents the positions (x1, y1), (x2, y2), (x3, y3), (x4, y4), (x5, y5), (x6, y6), (x7, y7), (x8, y8), (x9, y9), and (x10, y10). Furthermore, the level-number information generated by the first processor 11 represents luminance level numbers of "2" and "3".

With reference back to FIG. 2, the feature-point information $V_{D3}$ outputted from the first processor 11 is stored into the second memory 12. The feature-point information $V_{D3}$ is read out from the second memory 12 before being fed to the third processor 14. The feature-point information fed to the third memory 14 from the second memory 12 is now denoted by "$V_{D4}$".

The second processor 13 detects edge information from the luminance information $V_{D2}$. Then, the second processor 13 generates information $V_{D5}$ of an edge mask from the edge information. The second processor 13 outputs the edge-mask information $V_{D5}$ to the third processor 14.

Figures 4, 5:
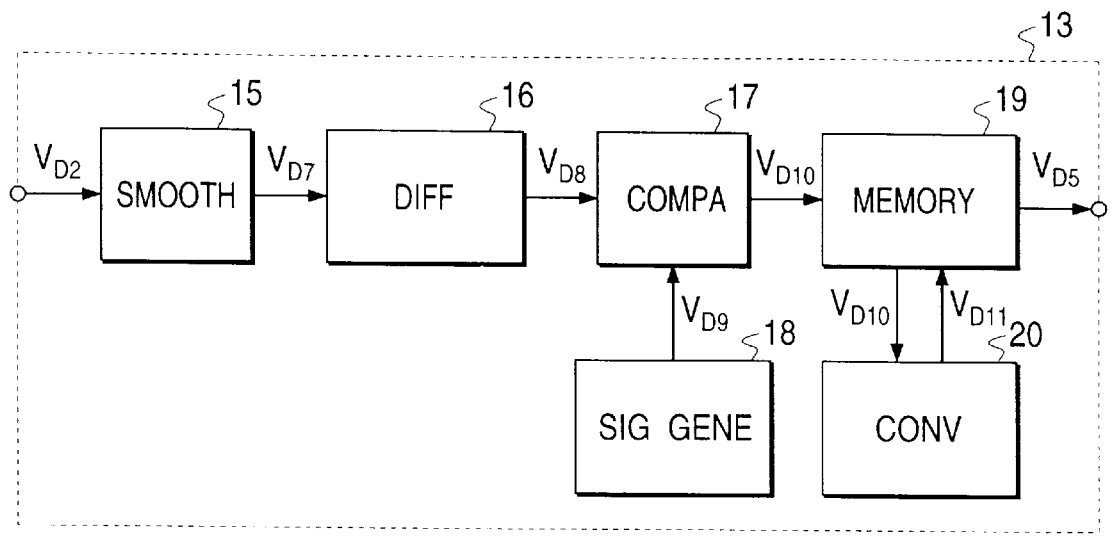
FIG. 4 is a diagram of a processor in FIG. 2.
FIG. 5 is a diagram of an example of filtering coefficients related to a Laplacian filter.

As shown in FIG. 4, the second processor 13 has a smoothing section 15, a differentiating section 16, a comparing section 17, a signal generator 18, a memory 19, and a converter 20. The input side of the smoothing section 15 follows the memory 10 (see FIG. 2). The output side of the smoothing section 15 is successively followed by the differentiating section 16 and the comparing section 17. The signal generator 18 is connected to the comparing section 17. The output side of the comparing section 17 is connected to the input side of the memory 19. The converter 20 is connected to the memory 19. The output side of the memory 19 is followed by the processor 14 (see FIG. 2).

The smoothing section 15 receives the luminance information $V_{D2}$ from the memory 10 (see FIG. 2), and smooths the luminance information $V_{D2}$ into new luminance information $V_{D7}$ on a pixel-by-pixel basis. The smoothing section 15 removes noise from the luminance information $V_{D2}$ without depriving the luminance information $V_{D2}$ of edge information. The smoothing section 15 outputs the new luminance information $V_{D7}$.

The differentiating section 16 receives the luminance information $V_{D7}$ from the smoothing section 15, and differentiates the luminance information $V_{D7}$ into data $V_{D8}$ representative of an edge strength on a pixel-by-pixel basis. Specifically, the differentiating section 16 implements a two-dimensional differentiating process which corresponds to a Laplacian filter having a matrix of 3×3 filtering coefficients assigned to respective 3×3 adjacent pixels centered at a pixel of interest. An example of the matrix of the 3×3 filtering coefficients is shown in FIG. 5. The differentiating section 16 calculates the absolute values of the values represented by the data which results from the processing by the Laplacian filter. Thus, the differentiating section 16 generates data representative of the absolute values which is equal to the edge strength data $V_{D8}$. The differentiating section 16 outputs the edge strength data $V_{D8}$.

The comparing section 17 receives the edge strength data $V_{D8}$ from the differentiating section 16. The comparing section 17 receives output data from the signal generator 18 which represents a predetermined threshold value $V_{D9}$. The comparing section 17 compares the edge strength represented by the data $V_{D8}$ with the threshold value $V_{D9}$ on a pixel-by-pixel basis to detect every edge pixel (every pixel corresponding to a picture edge). Thereby, the comparing section 17 binarizes the edge strength data $V_{D8}$ into data $V_{D10}$ representing an edge mask composed of edge pixels. The comparing section 17 outputs the edge mask data $V_{D10}$.

It should be noted that the comparing section 17 may compare the edge strength represented by the data $V_{D8}$ with a plurality of threshold values to generate multi-value data representing edge pixels.

The edge mask data $V_{D10}$ outputted from the comparing section 17 is stored into the memory 19. The converter 20 reads out the edge mask data $V_{D10}$ from the memory 19, and converts the edge mask data $V_{D10}$ into new edge mask data $V_{D11}$. Specifically, the converter 20 checks the surroundings of every non-edge pixel (every "0" data piece or every "off" data piece) represented by the edge mask data $V_{D10}$. When a given number of edge pixels or more are present among 8 pixels surrounding the non-edge pixel of interest, the converter 20 changes the data piece of the non-edge pixel of interest from "0" to "1" (from "off" to "on"). In other words, the converter 20 changes the non-edge pixel of interest to an edge pixel. When less than the given number of edge pixels are present among the 8 pixels surrounding the non-edge pixel of interest, the converter 20 maintains the data piece of the non-edge pixel of interest as it is. The processing by the converter 20 corresponds to expanding an area of the edge mask. The expansion of the edge mask area compensates for a difference between the approximate equal-luminance lines and the original equal-luminance lines (or the true equal-luminance lines). The converter 20 writes the new edge mask data $V_{D11}$ into the memory 19.

Figure 6:
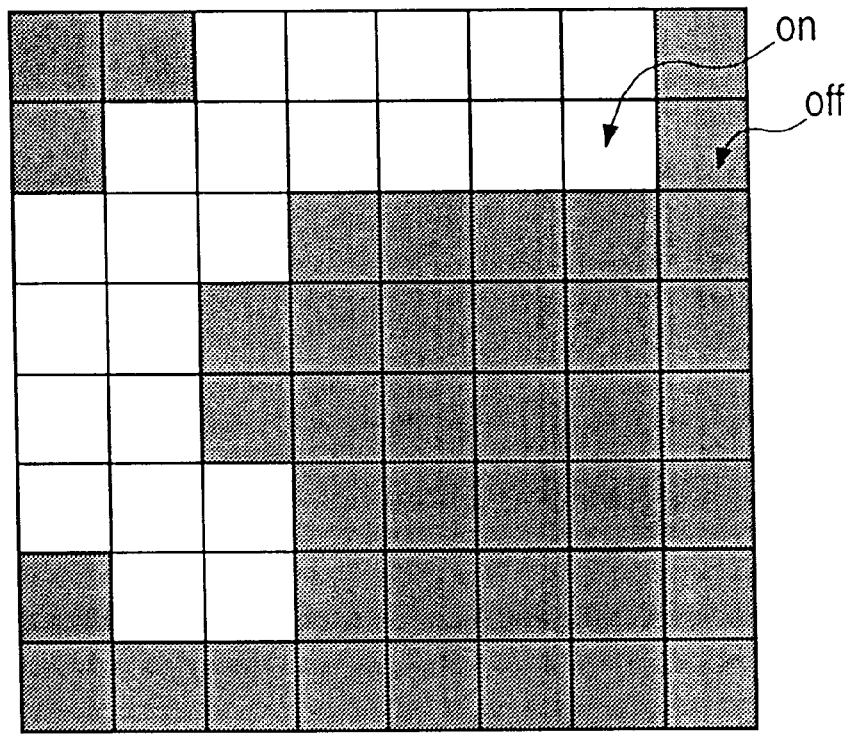
FIG. 6 is a diagram of an example of a matrix array of pixels represented by edge mask data.

In the memory 19, the edge mask data $V_{D10}$ is replaced by the edge mask data $V_{D11}$. The edge mask data $V_{D11}$ is read out from the memory 19 before being fed to the processor 14 (see FIG. 2). The edge mask data fed to the third processor 14 from the memory 19 is now denoted by "$V_{D5}$". FIG. 6 shows an example of a matrix array of pixels represented by the edge mask data $V_{D5}$, where dark squares correspond to non-edge pixels ("off" data pieces) while white squares correspond to edge pixels ("on" data pieces).

With reference back to FIG. 2, the third processor 14 receives the feature-point information $V_{D4}$ from the second memory 12. The third processor 14 receives the edge mask data $V_{D5}$ from the second processor 13. The third processor 14 generates the composite information (the edge and feature-point information) $V_{D6}$ from the feature-point information $V_{D4}$ and the edge mask data $V_{D5}$.

Figure 7:
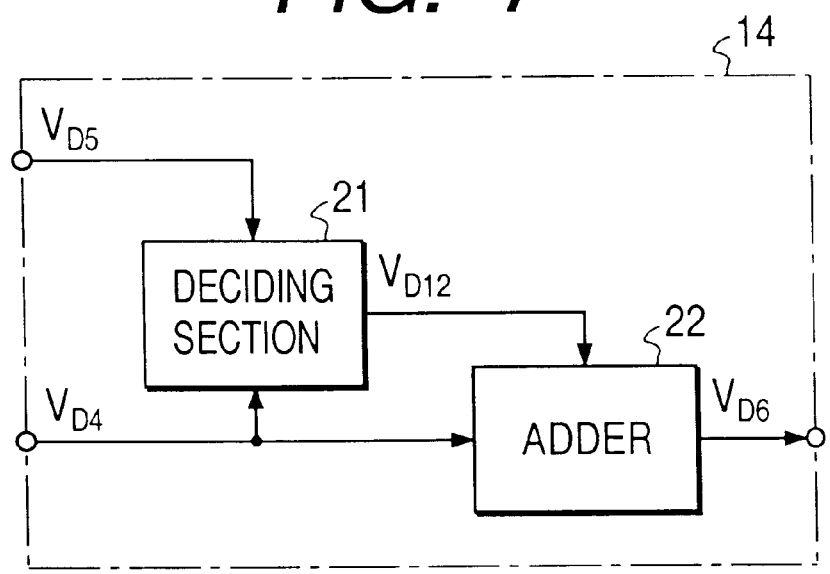
FIG. 7 is a diagram of another processor in FIG. 2.

As shown in FIG. 7, the third processor 14 has a deciding section 21 and an adder 22. The input side of the deciding section 21 is connected to the memory 12 and the processor 13 (see FIG. 2). The input side of the adder 22 is connected to the memory 12 (see FIG. 2). The input side of the adder 22 is also connected to the output side of the deciding section 21. The output side of the adder 22 is followed by the encoder 5 (see FIG. 1).

The deciding section 21 receives the feature-point information $V_{D4}$ from the memory 12 (see FIG. 2). The deciding section 21 receives the edge mask data $V_{D5}$ from the processor 13 (see FIG. 2). The deciding section 21 checks the states of pixels, on which every straight line segment of each approximate equal-luminance line extends, in response to the feature-point information $V_{D4}$ and the edge mask data $V_{D5}$. When a half or more of the checked pixels are "on" (that is, "1"), the deciding section 21 deems the related straight line segment to be an edge line segment. Otherwise, the deciding section 21 deems the related straight line segment to be not an edge line segment. The deciding section 21 generates a 1-bit edge decision flag $V_{D12}$ for every straight line segment, that is, for every feature point. The deciding section 21 sets the edge decision flag $V_{D12}$ to "on" or "1" in the case where the related straight line segment is deemed to be an edge line segment. The deciding section 21 sets the edge decision flag $V_{D12}$ to "off" or "0" in the case where the related straight line segment is deemed to be not an edge line segment. The deciding section 21 outputs the edge decision flag $V_{D12}$. It should be noted that the edge decision flag $V_{D12}$ corresponds to edge information.

The adder 22 receives the feature-point information $V_{D4}$ from the memory 12 (see FIG. 2). The adder 22 receives the edge decision flag (the edge information) $V_{D12}$ from the deciding section 21. The device 22 adds the edge decision flag $V_{D12}$ to each portion 20 of the feature-point information $V_{D4}$ which represents a feature point corresponding to a starting point of a straight line segment of an approximate equal-luminance line. Thereby, the adder 22 combines the feature-point information $V_{D4}$ and the edge decision flag $V_{D12}$ into the composite information (the edge and feature-point information) $V_{D6}$. The adder 22 outputs the composite information $V_{D6}$ to the encoder 5 (see FIG. 1).

Figure 8:
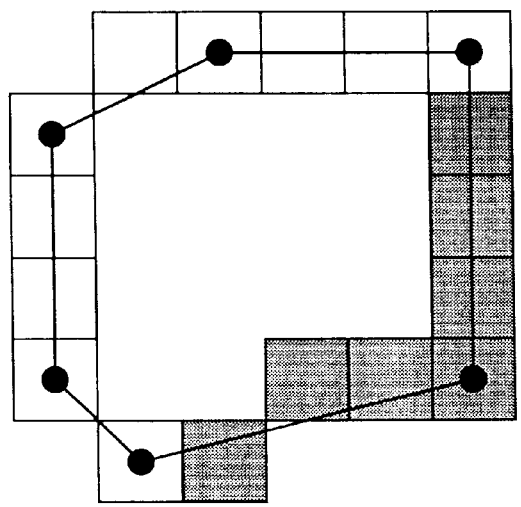
FIG. 8 is a diagram of a first approximate equal-luminance line (a first approximate iso-luminance line), related feature points, and related pixels represented by edge mask data.
Figure 9:
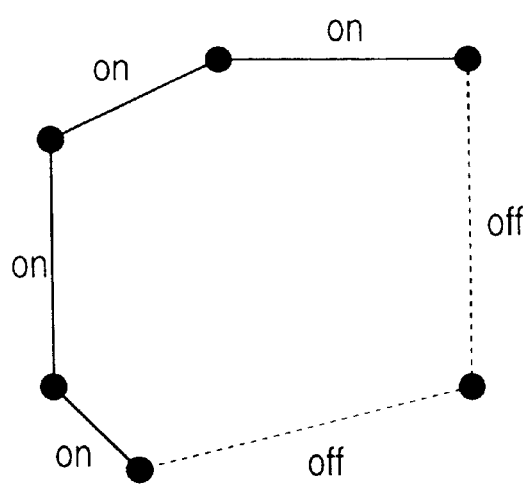
FIG. 9 is a diagram of the approximate equal-luminance line in FIG. 8 and the result of a decision as to whether or not each segment of the approximate equal-luminance line agrees with an edge line segment.

FIG. 8 shows a first example of an approximate equal-luminance line and states of pixels on which the approximate equal-luminance line extends. In this case, straight line segments of the approximate equal-luminance line are deemed to be edge line segments ("on") or to be not edge line segments ("off") as shown in FIG. 9. It should be noted that the approximate equal-luminance line in FIG. 8 agrees with the outer equal-luminance line in FIG. 3.

Figure 10:
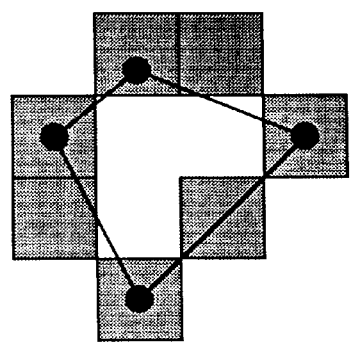
FIG. 10 is a diagram of a second approximate equal-luminance line (a second approximate iso-luminance line), related feature points, and related pixels represented by edge mask data.
Figure 11:
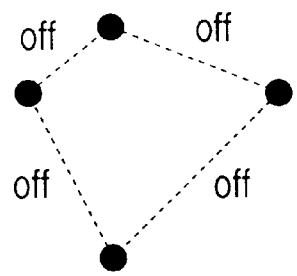
FIG. 11 is a diagram of the approximate equal-luminance line in FIG. 10 and the result of a decision as to whether or not each segment of the approximate equal-luminance line agrees with an edge line segment.

FIG. 10 shows a second example of an approximate equal-luminance line and states of pixels on which the approximate equal-luminance line extends. In this case, straight line segments of the approximate equal-luminance line are deemed to be edge line segments ("on") or to be not edge line segments ("off") as shown in FIG. 11. It should be noted the approximate equal-luminance line in FIG. 10 agrees with the inner equal-luminance line in FIG. 3.

In the case where the feature-point information $V_{D4}$ contains address information representing the positions (x1, y1), (x2, y2), (x3, y3), (x4, y4), (x5, y5), (x6, y6), (x7, y7), (x8, y8), (x9, y9), and (x10, y10) as shown in FIGS. 3, 8, and 9, the composite information luminance $V_{D6}$ represents the positions and the edge decision flag $V_{D6}$ as (x1, y1, on), (x2, y2, on), (x3, y3, on), (x4, y4, on), (x5, y5, off), (x6, y6, off), (x7, y7, off), (x8, y8, off), (x9, $y_9$, off), and (x10, $y_{10}$, off).

Figure 12:
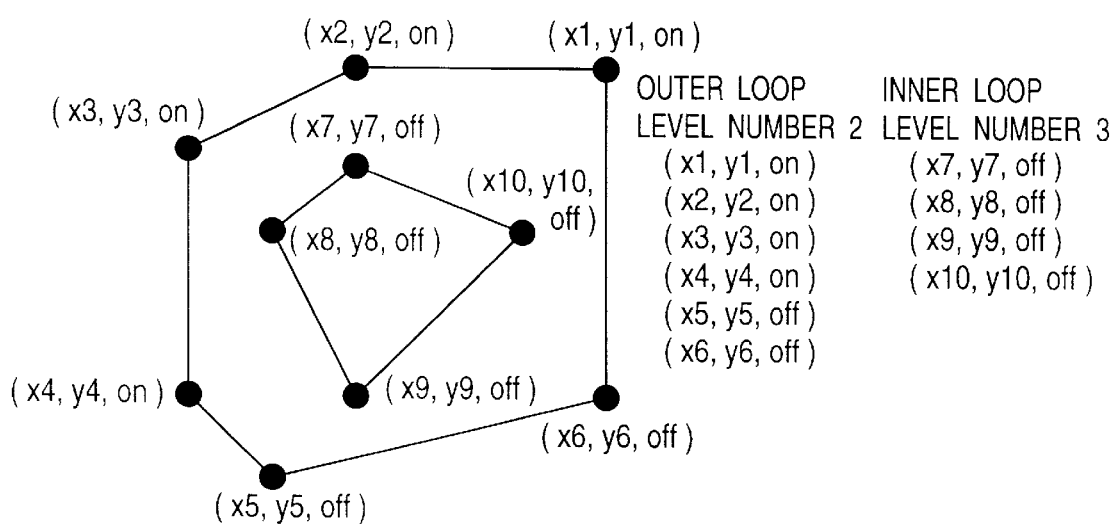
FIG. 12 is a diagram of the approximate equal-luminance lines (the approximate iso-luminance lines) in FIG. 3, the related feature points, and related edge decision flags.

FIG. 12 shows approximate equal-luminance lines which agree with those in FIG. 3. In FIG. 12, every combination of an address information piece and an edge decision flag $V_{D6}$ is indicated at a place near the corresponding feature point.

Figure 13:
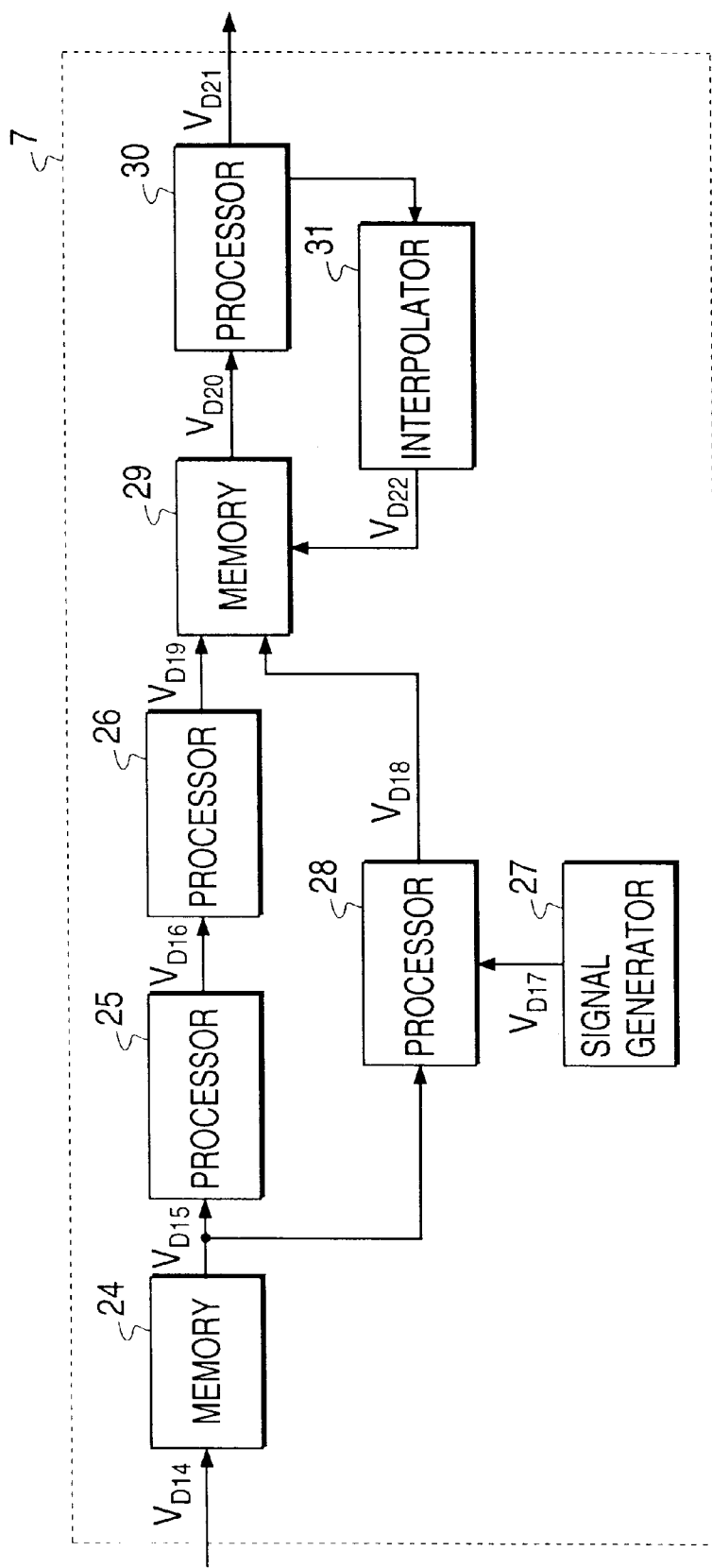
FIG. 13 is a diagram of a decoder in FIG. 1.

As shown in FIG. 13, the second decoder 7 includes a first memory 24, a first processor 25, a second processor 26, a signal generator 27, a third processor 28, a second memory 29, a fourth processor 30, and an interpolator 31. The input side of the first memory 24 follows the decoder 6 (see FIG. 1). The output side of the first memory 24 is followed by the first and third processors 25 and 28. The first processor 25 is successively followed by the second processor 26 and the second memory 29. The signal generator 27 is connected to the third processor 28. The third processor 28 is followed by the second memory 29. The second memory 29 is followed by the fourth processor 30. The output side of the fourth processor 30 is connected to the D/A converter 8 (see FIG. 1). The input side of the interpolator 31 is connected to the fourth processor 30. The output side of the interpolator 31 is connected to the second memory 29.

Figure 14:
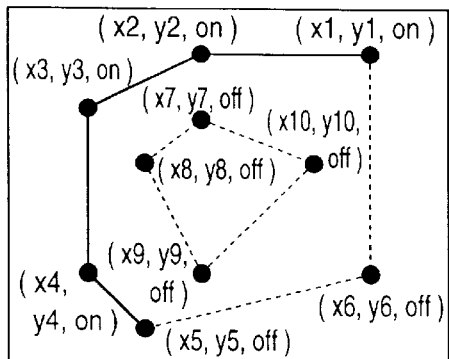
FIG. 14 is a diagram of an example of the contents of various data occurring in the decoder of FIG. 13.

The edge and feature-point information $V_{D14}$ outputted from the decoder 6 (see FIG. 1) is stored into the first memory 24. The edge and feature-point information $V_{D14}$ is read out from the first memory 24 before being fed to the first and third processors 25 and 28. The edge and feature-point information fed to the first and third processors 25 and 28 from the first memory 24 is now denoted by "$V_{D15}$". An example of the contents of the edge and feature-point information $V_{D15}$ is shown in the portions (a) and (b) of FIG. 14.

The first processor 25 separates the edge and feature-point information $V_{D15}$ into level-number information and address information. The first processor 25 generates information $V_{D16}$ of a multi-value mask from the level-number information and the address information by a known covering process such as the process disclosed in Japanese published unexamined patent application 7-296170. An example of the contents of the multi-value mask information $V_{D16}$ is shown in the portion (e) of FIG. 14. The first processor 25 outputs the multi-value mask information $V_{D16}$.

The second processor 26 receives the multi-value mask information $V_{D16}$ from the first processor 25. The second processor 26 derives information of the boundaries among regions having different luminance level numbers from the multi-value mask information $V_{D16}$. The second processor 26 sets levels ("1=", "1+", "2–", "2=", "2+", "3–", "3=") for respective pixels at the region boundaries, and thereby generates second multi-value mask information $V_{D19}$. An example of the contents of the second multi-value mask information $V_{D19}$ is shown in the portion (f) of FIG. 14. The second processor 26 outputs the second multi-value mask information $V_{D19}$.

The third processor 28 separates the edge and feature-point information $V_{D15}$ into the address information and the edge information. The third processor 28 receives output data from the signal generator 27 which represents parameters $V_{D17}$ for adjustment values. The third processor 28 generates data of a first file of adjustment values "α" in response to the address information, the edge information, and the adjustment-value parameters $V_{D17}$. Specifically, the third processor 28 sets a first given adjustment value (equal to, for example, "4") for every edge pixel corresponding to edge information of "on" or "1". The first given adjustment value is chosen to match an edge. In addition, the third processor 28 sets a second given adjustment value (equal to, for example, "12") for every edge pixel corresponding to edge information of "off" or "0". The second given adjustment value is chosen to match a gradation area. Generally, the second given adjustment value is greater than the first given adjustment value. The first and second given adjustment values are provided by the adjustment-value parameters $V_{D17}$. Furthermore, the third processor 28 sets "0" for every non-edge pixel. An example of the first file of the adjustment values "α" is shown in the portion (c) of FIG. 14.

The third processor 28 converts the first file of the adjustment values into a second file of adjustment values by an averaging process using 3×3 adjacent pixels centered at a pixel of interest. Specifically, an adjustment value for a pixel of interest in the second file is determined by averaging the adjustment values for the pixel of interest and the neighboring pixels in the first file. As a result of the averaging process, an area of edge pixels in the second file expands from that in the first file by one pixel. An example of the second file of the adjustment values is shown in the portion (d) of FIG. 14. The third processor 28 generates and outputs information $V_{D18}$ of the second file of the adjustment values.

The multi-value mask information $V_{D19}$ outputted from the second processor 26 is stored into the second memory 29. The adjustment-value file information $V_{D18}$ outputted from the third processor 28 is stored into the second memory 29. Information $V_{D22}$ of interpolation pixel luminance values which is outputted from the interpolator 31 is stored into the second memory 29. The multi-value mask information $V_{D19}$, the adjustment-value file information $V_{D18}$, and the interpolation pixel luminance information $V_{D22}$ are read out from the second memory 29 before being fed to the fourth processor 30 as composite data $V_{D20}$.

The fourth processor 30 extracts the adjustment-value file information $V_{D18}$ and the multi-value mask information $V_{D19}$ from the composite data $V_{D20}$. The fourth processor 30 selects pixels at region boundaries from among pixels related to the multi-value mask information $V_{D19}$. For each of the selected pixels, the fourth processor 30 reads out a corresponding value MV represented by the multi-value mask information $V_{D19}$ and also a corresponding adjustment value "α" represented by the adjustment-value file information $V_{D18}$. For each of the selected pixels, the fourth processor 30 calculates a reproduced luminance value RV from the corresponding value MV and the corresponding adjustment value "α" by referring to relations in the portion (h) of FIG. 14. Specifically, the reproduced luminance value RV is set to "15" when the corresponding value MV is equal to "1=". The reproduced luminance value RV is set to "15+α" when the corresponding value MV is equal to "1+". The reproduced luminance value RV is set to "45−α" when the corresponding value MV is equal to "2−". The reproduced luminance value RV is set to "45" when the corresponding value MV is equal to "2=". The reproduced luminance value RV is set to "45+α" when the corresponding value MV is equal to "2+". The reproduced luminance value RV is set to "75−α" when the corresponding value MV is equal to "3−". The reproduced luminance value RV is set to "75" when the corresponding value MV is equal to "3=". An example of the reproduced luminance values RV is shown in the portion (g) of FIG. 14. The fourth processor 30 informs the interpolator 31 of the reproduced luminance values RV at respective pixels on region boundaries.

For each of pixels except the pixels on the region boundaries, the interpolator 31 calculates a reproduced luminance value (an interpolation pixel luminance value) SV from reproduced luminance values RV at region-boundary pixels around the pixel of interest according to linear interpolation using the distances between the pixel of interest and the region-boundary pixels along a horizontal direction, a vertical direction, and oblique directions. The calculation of the interpolation pixel luminance value SV may be based on a known way such as the way disclosed by Japanese published unexamined patent application 7-296170. The interpolator 31 generates the information $V_{D22}$ of the interpolation pixel luminance values SV. The interpolator 31 outputs the information $V_{D22}$ of the interpolation pixel luminance values SV to the second memory 29.

The fourth processor 30 extracts the interpolation pixel luminance information $V_{D22}$ from the composite data $V_{D20}$. The fourth processor 30 combines the information of the reproduced luminance values RV and the information $V_{D22}$ of the interpolation pixel luminance values SV into reproduced luminance information $V_{D21}$. The fourth processor 30 outputs the reproduced luminance information $V_{D21}$ to the D/A converter 8 (see FIG. 1).

Figure 15:
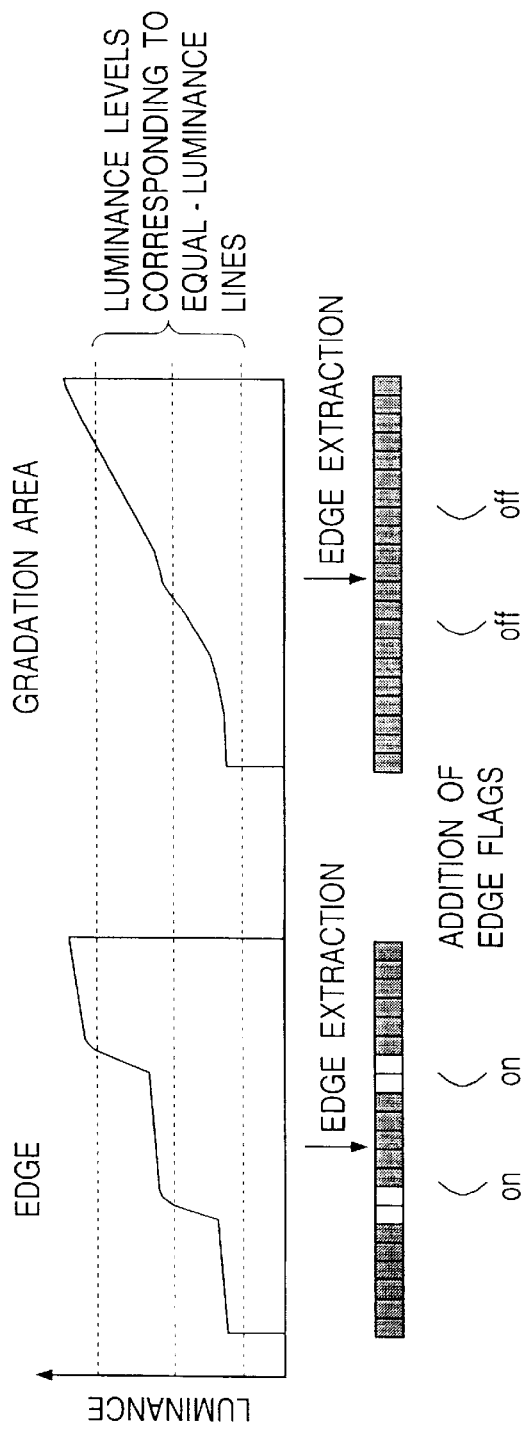
FIG. 15 is a diagram of an example of variations in luminance in a picture edge portion and a picture gradation portion, and an example of the contents of edge mask data to which edge decision flags are added.

With reference to FIG. 15, an edge decision flag $V_{D12}$ of "on" or "1" is added to each portion of the feature-point information $V_{D4}$ which represents a feature point on a picture edge. On the other hand, an edge decision flag $V_{D12}$ of "off" or "0" is added to each portion of the feature-point information $V_{D4}$ which represents a feature point on a picture gradation area.

Figure 16B:
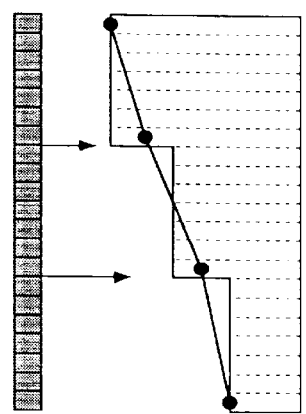
FIG. 16 is a diagram of an example of variations in luminance in a recovered picture edge portion and a recovered picture gradation portion, and an example of the contents of recovered edge mask data which contains edge decision flags.
Figure 16A:
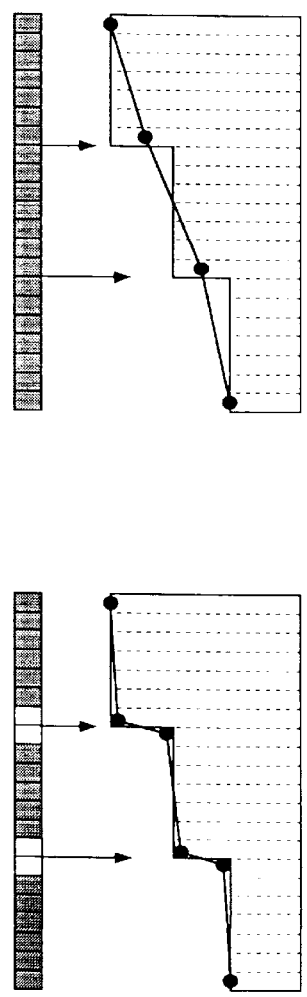

With reference to FIG. 16, a decoding side discriminates a picture edge portion and a picture gradation portion from each other by referring to the states of the edge decision flags $V_{D12}$. The third processor 28 in FIG. 13 sets a small adjustment value "α" for every edge pixel corresponding to an edge decision flag $V_{D12}$ of "on" or "1". The small adjustment value "α" enables a large luminance gradient at a reproduced picture edge portion. On the other hand, the third processor 28 sets a great adjustment value "α" for every edge pixel corresponding to an edge decision flag $V_{D12}$ of "off" or "0". The great adjustment value "α" enables a small luminance gradient in a reproduced picture gradation portion. In each picture gradation portion, it is preferable to set luminance values for pixels on only one sides (for example, higher-luminance sides) of region boundaries. In this case, a reproduced picture gradation portion has a smoother luminance variation.

Second Embodiment

A second embodiment of this invention is similar to the embodiment of FIGS. 1–16 except for design changes indicated hereinafter. The second embodiment includes a processor 14A instead of the processor 14 in FIGS. 2 and 7.

Figure 17:
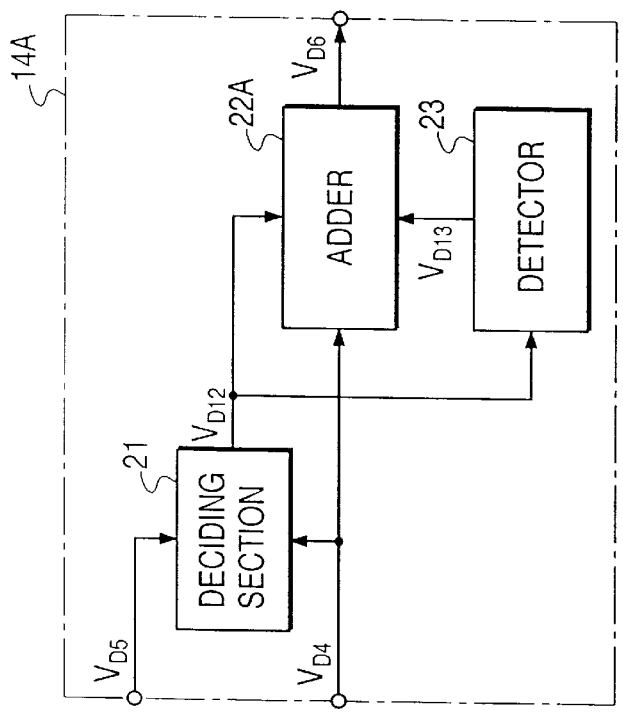
FIG. 17 is a diagram of a processor in a picture-information processing apparatus according to a second embodiment of this invention.

As shown in FIG. 17, the processor 14A has a deciding section 21, an adder 22A, and a detector 23. The input side of the deciding section 21 is connected to the memory 12 and the processor 13 (see FIG. 2). The input side of the adder 22A is connected to the memory 12 (see FIG. 2). The input side of the adder 22A is also connected to the output sides of the deciding section 21 and the detector 23. The input side of the detector 23 is connected to the output side of the deciding section 21. The output side of the adder 22A is followed by the encoder 5 (see FIG. 1).

The deciding section 21 generates an edge decision flag $V_{D12}$ in response to the feature-point information $V_{D4}$ and the edge mask data $V_{D5}$ for every feature point. The deciding section 21 informs the adder 22A and the detector 23 of the edge decision flag $V_{D12}$.

The device 23 detects a change of the edge decision flag $V_{D12}$ from "on" to "off" (from "1" to "0") and also a change thereof from "off" to "on" (from "0" to "1"). The detector 23 generates and outputs information $V_{D13}$ of the detected changes of the edge decision flag $V_{D12}$.

The adder 22A receives the flag change information $V_{D13}$ from the detector 23. Only in the case where the edge decision flag $V_{D12}$ changes, the device 22A adds the edge decision flag $V_{D12}$ to each portion of the feature-point information $V_{D4}$ which represents a feature point corresponding to a starting point of a straight line segment of an approximate equal-luminance line. This process results in a higher degree of data compression. The adder 22A combines the feature-point information $V_{D4}$ and the edge decision flag $V_{D12}$ into the composite information (the edge and feature-point information) $V_{D6}$. The adder 22A outputs the composite information $V_{D6}$ to the encoder 5 (see FIG. 1).

Third Embodiment

Figure 18:
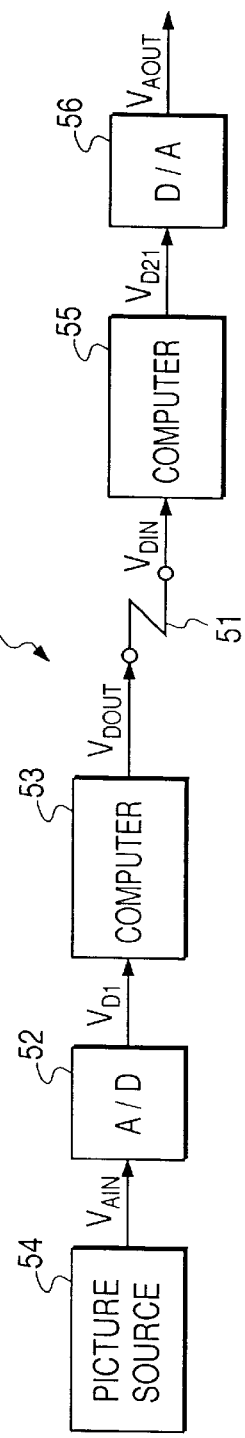
FIG. 18 is a block diagram of a picture-information processing apparatus according to a third embodiment of this invention.

With reference to FIG. 18, a picture-information processing apparatus 50 includes a compressing section and an expanding section connected via a transmission line 51. The compressing section of the picture-information processing apparatus 50 has an analog-to-digital (A/D) converter 52 and a computer 53. The A/D converter 52 follows a picture-information source 54. The A/D converter 52 is followed by the computer 53. The computer 53 is connected to the transmission line 51. The transmission line 51 includes, for example, an information recording apparatus, a recording medium, and an information reproducing apparatus.

The expanding section of the picture-information processing apparatus 50 has a computer 55 and a digital-to-analog (D/A) converter 56. The computer 55 is connected to the transmission line 51. The computer 55 is also connected to the input side of the the D/A converter 56.

Analog picture information (analog luminance information) $V_{AIN}$ outputted from the picture-information source 54 is changed by the A/D converter 52 into corresponding digital luminance information $V_{D1}$. The A/D converter 52 outputs the digital luminance information $V_{D1}$ to the computer 53. The computer 53 is programmed to encode and compress the digital luminance information $V_{D1}$ into data $V_{DOUT}$ of a given code suited to the characteristics of the transmission line 51. The computer 53 outputs the given-code data $V_{DOUT}$ to the transmission line 51.

The computer 55 receives data $V_{DIN}$ from the transmission line 51. The computer 55 is programmed to decode and expand the received data $V_{DIN}$ into digital luminance information $V_{D21}$. The processing by the computer 55 is inverse with respect to the processing by the computer 53. The computer 55 outputs the digital luminance information $V_{D21}$ to the D/A converter 56. The D/A converter 56 changes the digital luminance information $V_{D21}$ into corresponding analog luminance information (corresponding analog picture information) $V_{AOUT}$. Thus, the D/A converter 56 recovers the original analog picture information $V_{AOUT}$. The D/A converter 56 outputs the recovered analog picture information $V_{AOUT}$.

Figure 19:
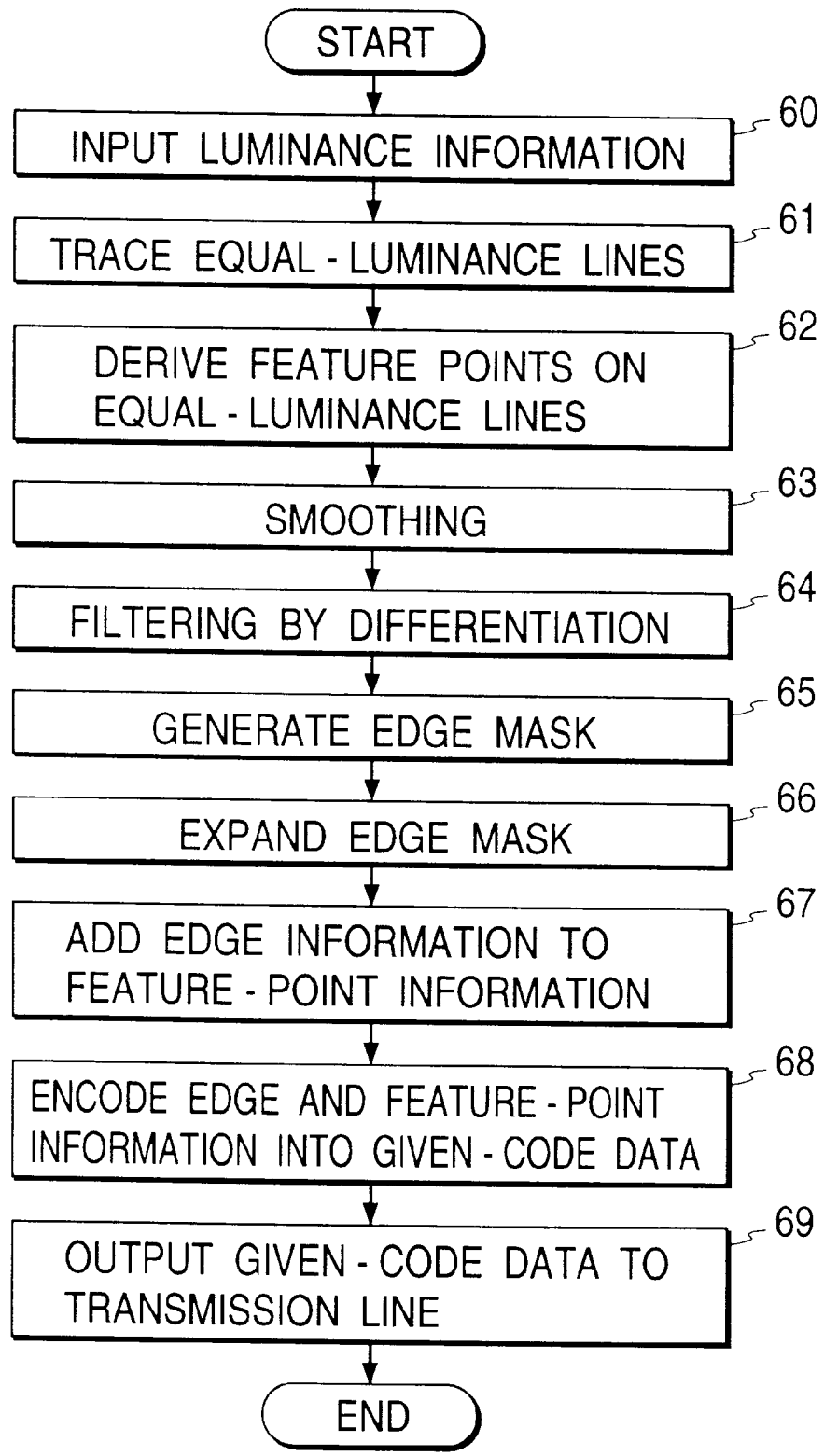
FIG. 19 is a flowchart of a segment of a program for controlling a computer in FIG. 18.

The computer 53 includes a combination of an input/output port, a CPU, a ROM, and a RAM. The computer 53 operates in accordance with a program stored in the ROM. FIG. 19 is a flowchart of a segment of the program which is iteratively executed.

As shown in FIG. 19, a first step 60 of the program segment stores the digital luminance information $V_{D1}$ into the RAM. It should be noted that the digital luminance information $V_{D1}$ is outputted from the A/D converter 52 (see FIG. 18). The digital luminance information stored in the RAM is now denoted by "$V_{D2}$".

A step 61 following the step 60 traces pixels having equal luminance values, and thereby generates information of equal-luminance lines (iso-luminance lines) from the luminance information $V_{D2}$ in a known way such as the way disclosed by Japanese published unexamined patent application 7-296170.

A step 62 subsequent to the step 61 extracts or derives feature points from the equal-luminance lines in a known way such as the way disclosed by Japanese published unexamined patent application 7-296170. For example, the step 62 converts the equal-luminance lines into approximate equal-luminance lines having polygonal shapes. The step 62 defines corners of the polygonal shapes as feature points. The step 62 generates information of positions of the feature points, that is, address information of the feature points. Also, the step 62 generates information of luminance values (luminance level numbers) at the feature points which agrees with information of luminance values corresponding to respective equal-luminance lines (iso-luminance lines). The step 62 combines the address information and the level-number information into feature-point information $V_{D4}$.

A step 63 following the step 62 smooths the luminance information $V_{D2}$ into new luminance information $V_{D7}$ on a pixel-by-pixel basis. The step 63 removes noise from the luminance information $V_{D2}$ without depriving the luminance information $V_{D2}$ of edge-related information.

A step 64 subsequent to the step 63 differentiates the luminance information $V_{D7}$ into data $V_{D8}$ representative of an edge strength on a pixel-by-pixel basis. Specifically, the step 64 implements a two-dimensional differentiating process which corresponds to a Laplacian filter having a matrix of 3×3 filtering coefficients assigned to respective 3×3 adjacent pixels centered at a pixel of interest. The step 64 calculates the absolute values of the values represented by the data which results from the processing by the Laplacian filter. Thus, the step 64 generates data representative of the absolute values which is equal to the edge strength data $V_{D8}$.

A step 65 following the step 64 compares the edge strength represented by the data $V_{D8}$ with a predetermined threshold value $V_{D9}$ on a pixel-by-pixel basis to detect every edge pixel (every pixel corresponding to a picture edge). Thereby, the step 65 binarizes the edge strength data $V_{D8}$ into data $V_{D10}$ representing an edge mask composed of edge pixels.

A step 66 subsequent to the step 65 converts the edge mask data $V_{D10}$ into new edge mask data $V_{D11}$. Specifically, the step 66 checks the surroundings of every non-edge pixel (every "0" data piece or every "off" data piece) represented by the edge mask data $V_{D10}$. When a given number of edge pixels or more are present among 8 pixels surrounding the non-edge pixel of interest, the step 66 changes the data piece of the non-edge pixel of interest from "0" to "1" (from "off" to "on"). In other words, the step 66 changes the non-edge pixel of interest to an edge pixel. When less than the given number of edge pixels are present among the 8 pixels surrounding the non-edge pixel of interest, the step 66 maintains the data piece of the non-edge pixel of interest as it is. The processing by the step 66 corresponds to expanding an area of the edge mask. The expansion of the edge mask area compensates for a difference between the approximate equal-luminance lines and the original equal-luminance lines (or the true equal-luminance lines). The resultant new edge mask data is now denoted by "$V_{D5}$".

A step 67 following the step 66 generates composite information (edge and feature-point information) $V_{D6}$ from the feature-point information $V_{D4}$ and the edge mask data $V_{D5}$. Specifically, the step 67 checks the states of pixels, on which every straight line segment of each approximate equal-luminance line extends, in response to the feature-point information $V_{D4}$ and the edge mask data $V_{D5}$. When a half or more of the checked pixels are "on" (that is, "1"), the step 67 deems the related straight line segment to be an edge line segment. Otherwise, the step 67 deems the related straight line segment to be not an edge line segment. The step 67 generates a 1-bit edge decision flag $V_{D12}$ for every straight line segment, that is, for every feature point. The step 67 sets the edge decision flag $V_{D12}$ to "on" or "1" in the case where the related straight line segment is deemed to be an edge line segment. The step 67 sets the edge decision flag $V_{D12}$ to "off" or "0" in the case where the related straight line segment is deemed to be not an edge line segment. It should be noted that the edge decision flag $V_{D12}$ corresponds to edge information. The step 67 adds the edge decision flag $V_{D12}$ to each portion of the feature-point information $V_{D4}$ which represents a feature point corresponding to a starting point of a straight line segment of an approximate equal-luminance line. Thereby, the step 67 combines the feature-point information $V_{D4}$ and the edge decision flag $V_{D12}$ into the composite information (the edge and feature-point information) $V_{D6}$.

A step 68 subsequent to the step 67 encodes the edge and feature-point information $V_{D6}$ into corresponding words of a given code suited to the characteristics of the transmission line 51 (see FIG. 18).

A step 69 following the step 68 outputs data $V_{DOUT}$ representative of the words of the given code to the transmission line 51 (see FIG. 18). After the step 69, the current execution cycle of the program segment ends.

Figure 20:
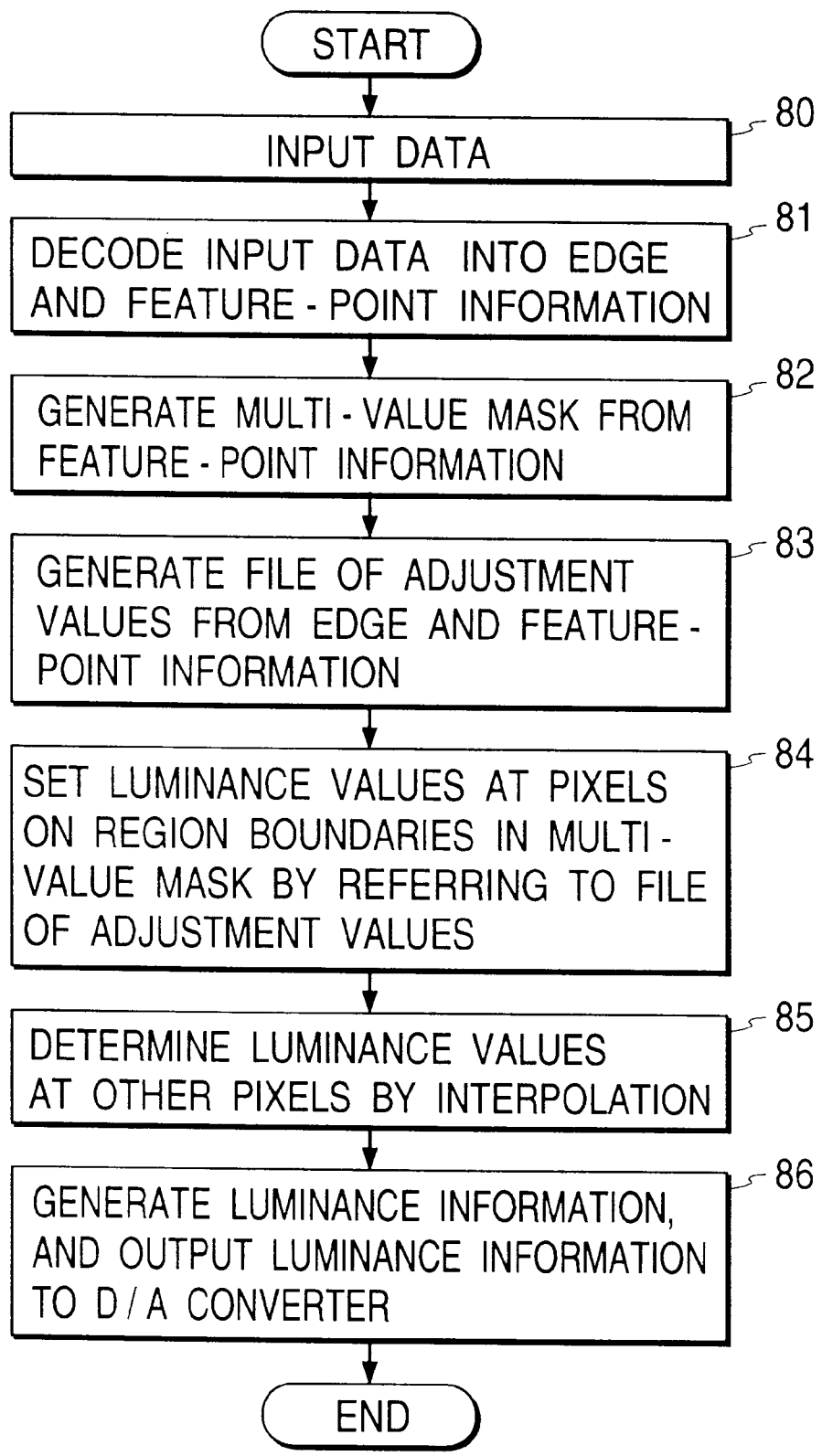
FIG. 20 is a flowchart of a segment of a program for controlling another computer in FIG. 18.

The computer 55 includes a combination of an input/output port, a CPU, a ROM, and a RAM. The computer 55 operates in accordance with a program stored in the ROM. FIG. 20 is a flowchart of a segment of the program which is iteratively executed.

As shown in FIG. 20, a first step 80 of the program segment stores the input data $V_{DIN}$ into the RAM. It should be noted that the input data $V_{DIN}$ is fed from the transmission line 51 (see FIG. 18).

A step 81 following the step 80 decodes the data $V_{DIN}$ into edge and feature-point information $V_{D15}$.

A step 82 subsequent to the step 81 separates the edge and feature-point information $V_{D15}$ into level-number information and address information. The step 82 generates information $V_{D16}$ of a multi-value mask from the level-number information and the address information by a known covering process such as the process disclosed in Japanese published unexamined patent application 7-296170. The step 82 derives information of the boundaries among regions having different luminance level numbers from the multi-value mask information $V_{D16}$. The step 82 sets levels ("1=", "1+", "2−", "2=", "2+", "3−", "3=") for respective pixels at the region boundaries, and thereby generates second multi-value mask information $V_{D19}$.

A step 83 following the step 82 separates the edge and feature-point information $V_{D15}$ into the address information and the edge information. The step 83 generates data of a first file of adjustment values "α" in response to the address information, the edge information, and adjustment-value parameters $V_{D17}$. Specifically, the step 83 sets a first given adjustment value (equal to, for example, "4") for every edge pixel corresponding to edge information of "on" or "1". The first given adjustment value is chosen to match an edge. In addition, the step 83 sets a second given adjustment value (equal to, for example, "12") for every edge pixel corresponding to edge information of "off" or "0". The second given adjustment value is chosen to match a gradation area. Generally, the second given adjustment value is greater than the first given adjustment value. The first and second given adjustment values are provided by the adjustment-value parameters $V_{D17}$. Furthermore, the step 83 sets "0" for every non-edge pixel. The step 83 converts the first file of the adjustment values into a second file of adjustment values by an averaging process using 3×3 adjacent pixels centered at a pixel of interest. Specifically, an adjustment value for a pixel of interest in the second file is determined by averaging the adjustment values for the pixel of interest and the neighboring pixels in the first file. As a result of the averaging process, an area of edge pixels in the second file expands from that in the first file by one pixel. The step 83 generates information $V_{D18}$ of the second file of the adjustment values.

A step 84 subsequent to the step 83 selects pixels at region boundaries from among pixels related to the multi-value mask information $V_{D19}$. For each of the selected pixels, the step 84 detects a corresponding value MV represented by the multi-value mask information $V_{D19}$ and also a corresponding adjustment value "α" represented by the adjustment-value file information $V_{D18}$. For each of the selected pixels, the step 84 calculates a reproduced luminance value RV from the corresponding value MV and the corresponding adjustment value "α" by referring to given relations. Specifically, the reproduced luminance value RV is set to "15" when the corresponding value MV is equal to "1=". The reproduced luminance value RV is set to "15+α" when the corresponding value MV is equal to "1+". The reproduced luminance value RV is set to "45−α" when the corresponding value MV is equal to "2−". The reproduced luminance value RV is set to "45" when the corresponding value MV is equal to "2=". The reproduced luminance value RV is set to "45+α" when the corresponding value MV is equal to "2+". The reproduced luminance value RV is set to "75−α" when the corresponding value MV is equal to "3−". The reproduced luminance value RV is set to "75" when the corresponding value MV is equal to "3=".

A step 85 following the step 84 implements the following process. For each of pixels except the pixels on the region boundaries, the step 85 calculates a reproduced luminance value (an interpolation pixel luminance value) SV from reproduced luminance values RV at region-boundary pixels around the pixel of interest according to linear interpolation using the distances between the pixel of interest and the region-boundary pixels along a horizontal direction, a vertical direction, and oblique directions. The calculation of the interpolation pixel luminance value SV may be based on a known way such as the way disclosed by Japanese published unexamined patent application 7-296170. The step 85 generates the information $V_{D22}$ of the interpolation pixel luminance values SV.

A step 86 subsequent to the step 85 combines the information of the reproduced luminance values RV and the information $V_{D22}$ of the interpolation pixel luminance values SV into reproduced luminance information $V_{D21}$. The step 86 outputs the reproduced luminance information $V_{D21}$ to the D/A converter 56 (see FIG. 18). After the step 86, the current execution cycle of the program segment ends.

It should be noted that the computers 53 and 55 may be common.

What is claimed is:

1. A picture-information processing apparatus comprising:

first means for generating information of an edge in a picture from luminance information in the picture;

second means for generating binary edge mask data corresponding to the edge from the edge information generated by the first means;

third means for generating information of feature points on an equal-luminance line in the picture from the luminance information in the picture, wherein the equal-luminance line is composed of segments extending between the feature points;

fourth means for deciding whether or not each of the segments of the equal-luminance line agrees with an edge line segment in response to the edge mask data generated by the second means and the feature-point information generated by the third means, and for generating an edge decision signal representing a result of deciding;

fifth means for adding the edge decision signal generated by the fourth means to the feature-point information generated by the third means; and wherein the second means comprises means for comparing the edge information generated by the first means with reference data to create the binary edge mask data, the reference data corresponding to a same threshold value for all pixels composing the picture.

2. A picture-information processing apparatus as recited in claim 1, further comprising sixth means for detecting a change in the edge decision signal generated by the fourth means, and seventh means for controlling said adding by the fifth means in response to the change detected by the sixth means.

3. A picture-information processing apparatus comprising:

first means for generating information of a multi-value mask by superimposing information pieces of feature points on plural equal-luminance lines of respective different levels in a picture;

second means for generating a data file of adjustment values corresponding to respective pixels of the picture in response to the information pieces of the feature points and information of an edge in the picture; and third means for recovering luminance information in the picture in response to the multi-value mask information generated by the first means and the adjustment-value file data generated by the second means.

4. An apparatus for generating information of feature points on an equal-luminance line in a picture from information of luminances of the picture, and for compressing information of the picture in response to the generated information of the feature points, the apparatus comprising:

first means for generating edge information in a picture from luminance information in the picture;

second means for generating binary edge data of a mask corresponding to an edge from the edge information generated by the first means;

third means for generating information of feature points on an equal-luminance line in the picture from the luminance information in the picture, wherein the equal-luminance line is composed of segments extending between the feature points;

fourth means for deciding whether or not each of the segments of the equal-luminance line areas agrees with an edge line segment in response to the binary edge mask data generated by the second means, and the feature-point information generated by the third means, and for generating an edge decision signal representing a result of said deciding;

fifth means for adding the edge decision signal generated by the fourth means to the feature-point information generated by the third means; and wherein the second means comprises means for comparing the edge information generated by the first means with reference data to create the binary edge mask data, the reference data corresponding to a same threshold value for all pixels composing the picture.

5. An apparatus for expanding compression-resultant picture data in response to information pieces of feature points on plural equal-luminance lines of respective different levels in a picture to recover information of luminances in the picture, the apparatus comprising:

first means for generating information of a multi-value mask by superimposing information pieces of feature points on plural equal-luminance lines of respective different levels in a picture;

second means for generating a data file of adjustment values corresponding to respective pixels of the picture in response to the information of the feature points and information of an edge in the picture; and third means for recovering luminance information in the picture in response to the multi-value mask information generated by the first means and the adjustment-value data file generated by the second means.

* * * * *